United States Patent [19]  
Di Giacomo et al.

[11] 3,933,703  
[45] Jan. 20, 1976

[54] BLENDS OF ETHYLENE/VINYL CHLORIDE/VINYL ACETATE COPOLYMER WITH NITROCELLULOSE

[75] Inventors: Armand Di Giacomo; Charles Vincent Murphy, both of Wilmington, Del.; Paul Swithin Pinkney, West Chester, Pa.

[73] Assignee: E. I. Du Pont de Nemours & Company, Wilmington, Del.

[22] Filed: Dec. 20, 1974

[21] Appl. No.: 535,136

[52] U.S. Cl. ............................ 260/17 R; 428/500  
[51] Int. Cl.² ............................................ C08L 1/18  
[58] Field of Search ................................. 260/17 R

[56] References Cited  
UNITED STATES PATENTS

| 3,503,909 | 3/1970 | Bowman et al. | 260/17 |
| 3,594,338 | 7/1971 | Hoh et al. | 260/17 |
| 3,816,363 | 6/1974 | Wicht et al. | 260/17 A |
| 3,830,761 | 8/1974 | Lenney | 260/8 |

Primary Examiner—Harold D. Anderson  
Assistant Examiner—Edward Woodberry

[57] ABSTRACT

Coating compositions comprising a blend of nitrocellulose and a copolymer of 6 to 32 percent by weight ethylene, 36 to 65 percent by weight vinyl chloride and 23 to 50 percent by weight vinyl acetate in a solvent system, the ratio of nitrocellulose to copolymer being 80:20 to 20:80. Modifying resins, e.g., sucrose benzoate, maleic acid resin, etc.; and plasticizers, e.g., tris 2,3-dibromopropyl phosphate, di(2-ethylhexyl) phthalate, etc., can be present in the compositions. The coatings possess excellent adhesion to various substrates as well as excellent hardness, toughness, low temperature flexibility and low flammability.

11 Claims, No Drawings

BLENDS OF ETHYLENE/VINYL CHLORIDE/VINYL ACETATE COPOLYMER WITH NITROCELLULOSE

BACKGROUND OF THE INVENTION

1. Field of the Invention

This invention relates to a coating composition and more particularly, to a coating composition comprising a blend of nitrocellulose and an ethylene/vinyl chloride/vinyl acetate copolymer.

2. Description of the Prior Art

Terpolymer resins prepared from ethylene, vinyl chloride and vinyl acetate are either available commercially or are disclosed in patent literature. For example, a terpolymer resin containing 25 percent by weight ethylene, 61 percent by weight vinyl chloride and 14 percent by weight vinyl acetate is sold commercially by Air Products and Chemicals, Inc. under the tradename Airflex 720 for paint application. This terpolymer is not compatible with nitrocellulose. A copolymer resin containing 60 percent by weight ethylene and 40 percent by weight vinyl acetate (Du Pont's Elvax 40) is compatible with nitrocellulose but due to its relatively high molecular weight, gives low solids at spray viscosity and has limited solubility in many lacquer solvents.

In U.S. Pat. No. 3,632,542 an emulsion polymerization process is disclosed for preparing a dispersion of ethylene, vinyl chloride and a vinyl ester, e.g., vinyl acetate. The contents of the dispersion is generally in the range of 5 to 25 percent by weight ethylene, 10 to 35 percent by weight vinyl chloride and 40 to 85 percent by weight vinyl ester. Such compositions when used as surface coating compositions give rise to films having improved resistance to hydrolysis by aqueous alkali.

The aforementioned commercial resins and dispersion do not have reduced flammability as well as other improved properties including reduced cost when blended with nitrocellulose.

SUMMARY OF THE INVENTION

It has now been found that a coating composition having reduced flammability comprises a blend of nitrocellulose and a copolymer consisting essentially of 6 to 32 percent by weight ethylene, 36 to 65 percent by weight vinyl chloride, and 23 to 50 percent by weight vinyl acetate in a solvent system, the ratio of nitrocellulose to copolymer being 80:20 to 20:80. Modified compositions contain modifying resins and/or plasticizers.

DETAILED DESCRIPTION OF THE INVENTION

The coating composition of this invention comprises a blend of nitrocellulose and a copolymer consisting essentially of ethylene, vinyl chloride and vinyl acetate. Preferably the compositions contain modifying resins and/or plasticizers.

The copolymers useful in formulating the blend consist essentially of ethylene, 6 to 32 percent by weight, vinyl chloride, 36 to 65 percent by weight, and vinyl acetate, 23 to 50 percent by weight. At least 23 percent by weight of vinyl acetate is necessary to achieve compatibility with the nitrocellulose. Toughness and low-temperature flexibility properties of the blends are impaired if the ethylene content of the copolymer is less than about 6 percent by weight. Hardness is adversely affected if the ethylene content exceeds about 32 percent by weight. Vinyl chloride content of about 36 percent by weight and higher contributes to reduced flammability. Preferably the copolymer composition consists essentially of 10 to 16 percent by weight ethylene, 50 to 60 percent by weight vinyl chloride and 23 to 35 percent by weight vinyl acetate.

The process used for making the copolymer is not critical provided that a soluble product is obtained. Minor amounts, e.g., up to about 3 percent by weight of monomers such as acrylic acid, methacrylic acid, etc., can be present in the copolymer. Polyfunctional monomers, however, such as divinyl succinate, diallyl maleate, ethylene glycol dimethacrylate, etc., have an adverse effect on solubility and therefore should not be included. Solution or emulsion polymerization processes, as illustrated by the examples below can be used. These polymerization processes are known. A suitable emulsion polymerization process is described in U.S. Pat. No. 3,632,542.

In the solution preparation of the copolymer, it is preferable to use a solvent which can be used as a component of the solvent system used for formulating the blend of nitrocellulose and copolymer. By using such a solvent system, it becomes unnecessary to isolate the copolymer prior to blending with the nitrocellulose. Suitable components for the solvent system include aromatic hydrocarbons such as benzene, toluene, xylene; aliphatic hydrocarbons such as hexane, heptane, etc.

In the emulsion preparation of the copolymer, the copolymer must be separated from the water prior to blending with nitrocellulose. The water can be removed by evaporation from a thin film. Preferably the water is removed by azeotropic distillation with a solvent such as xylene to leave a solution that can be used directly in making the solution of the blend of the nitrocellulose and copolymer.

The inherent viscosity of the copolymer is below 0.4 dl./g., preferably 0.2 dl./g. in acetone at 30°C. at a concentration of 0.5 g./100 ml. The low inherent viscosity enables the preparation of blend solutions of desirably high concentrations, e.g., up to 25 percent solids, that have low enough viscosity for spray applications.

Techniques for preparing copolymers having low inherent viscosity are known. The use of chain transfer agents is an effective technique. Useful chain transfer agents are xylene, toluene, isopropyl alcohol, tetrahydrofuran, dioxane, butyraldehyde, and long chain aliphatic mercaptans, i.e., those having 6 to 18 carbon atoms such as hexyl to octadecyl mercaptan. Xylene and toluene are particularly useful since they also serve as solvents for the blend of nitrocellulose and copolymer.

The ratio of nitrocellulose to copolymer in the blend may vary from 80:20 to 20:80. For optimum balance of film properties preferably the ratios are 40:60 to 60:40.

Preferred coating compositions contain blends modified by the addition of at least one modifying resin and/or plasticizer that are normally used in nitrocellulose lacquers. The modifying resin is generally present in up to about 12 percent by weight based on the weight of coating composition. The plasticizer is generally present in up to about 16 percent by weight based on the weight of coating composition. Examples of modifying resins are alkyd resins, polyacrylate and polymethacrylate resins, maleic acid resins, rosin ester resins, ester gum resins, sucrose benzoate, etc. Sucrose benzoate and maleic acid resins are preferred resins.

Useful plasticizers include di(2-ethylhexyl) phthalate, butyl benzyl phthalate, castor oil, tricresyl phosphate, tris 2,3-dibromopropyl phosphate, etc. Tris 2,3-dibromopropyl phosphate is a preferred plasticizer. Many of the useful resin types and plasticizers are described in "Organic Coating Technology," H. F. Payne, Volume 1, John Wiley and Sons, New York, New York, 1954.

For some applications it may be desirable to add one or more auxiliary ingredients to achieve certain performance properties, to impart color, to use the coating in a specific manner or to use a specific type of equipment. Among the useful auxiliary ingredients or additives are pigments, dyes, extenders, flatting agents, etc. Generally, the total amount of such permissive conventional additives will not exceed about 50 percent by weight, and preferably will not exceed about 30 percent by weight, of the total nonvolatile components of the composition, the remainder being nitrocellulose and copolymer of ethylene, vinyl chloride and vinyl acetate. In no case, moreover, will such permissive additive be employed in an amount which can deleteriously affect to any substantial degree the desirable characteristics of the coating composition of nitrocellulose and copolymer of ethylene, vinyl chloride and vinyl acetate as set forth hereinabove.

Any of the industrial nitrocellulose grades normally used in lacquers may be employed in the blends useful in the coating compositions. The viscosity of the nitrocellulose for spray application should be preferably below 0.5 second falling ball viscosity or less. The falling ball method measures the viscosity of a solution of nitrocellulose in certain standard solvent compositions, in terms of the time required for a 7.94 mm (5/16-inch) steel ball to fall through 25.4 cm. (10 inches) of the solution in a 2.54 cm. (1-inch) diameter tube. It corresponds to ASTM Method D-301-56.

The terms "quater-second," "half-second," etc. refer to the time of fall for a steel ball in the standard 12.2 percent nitrocellulose solution. Since a fall time of one second or less cannot be measured easily, more concentrated solutions are used with the low viscosity nitrocellulose. The percentage solids in the blend increases as the viscosity of the nitrocellulose decreases. At 0.5 second viscosity generally about twenty percent solids is present whereas at 0.25 viscosity generally about 25 percent solids is present.

The solvent system used in the coating composition is prepared from a wide range of commonly used nitrocellulose lacquer solvents. At least two solvents are used in the system, preferably up to six solvents or more. Examples of solvents include active solvents such as esters, e.g., ethyl acetate, isopropyl acetate, n-propyl acetate, n-butyl acetate, amyl acetate, etc.; ketones, e.g., methyl, n-butyl ketone, ethyl amyl ketone, methyl ethyl ketone, methyl isobutyl ketone, etc.; diluents such as aromatic and aliphatic hydrocarbons, e.g., xylene, toluene, or a similar hydrocarbon solvent; latent solvents such as alcohols, e.g., ethyl alcohol, isopropyl alcohol, methyl amyl alcohol, butyl alcohol, etc.; and ethers, e.g., ethylene glycol monomethyl ether, ethylene glycol monoethyl ether, ethylene glycol monobutyl ether, etc. Suitable conventional solvents in addition to those just mentioned may be selected from those commercially available.

The coating compositions can be applied to a wide variety of substrates such as wood, metal, e.g., steel, glass, plastic, paper and fabric. The method by which the coatings are applied are the commonly used methods such as spraying, roll coating, curtain coating, dipping or brushing, etc.

Coatings made from the coating compositions of this invention show excellent adhesion to the aforementioned substrates. The coatings also have excellent hardness, toughness, low temperature flexibility, and reduced flammability. The low temperature flexibility contributed by the copolymer makes possible the use of lower molecular weight nitrocellulose. This results in higher formulation solids at application viscosity as well as reduced coating composition costs.

The coating compositions are useful as decorative and protective coatings on various substrates, examples of which have been set forth above.

EXAMPLES OF THE INVENTION

The following examples wherein the parts and percentages are by weight illustrate the invention. The test results set forth in the examples can be determined by the following test procedures:

Durometer Hardness, Shore A ASTM D-2240-68. The instrument consists of a spring-loaded indenter that protrudes through a presser foot, and a pointer and scale (0.0 to 2.54 mm). When pressed against a sample, the indenter is forced back through a distance proportional to its hardness or resilience.

Glass transition temperature (differential scanning calorimetry).

Inherent viscosity: "Preparative Methods of Polymer Chemistry," Second Edition, Sorenson and Campbell, John Wiley & Sons, New York, 1968, Page 49.

Brookfield-Viscosity: 25°C. using a Brookfield Viscometer, Multi-Speed Model LVF. Selection of proper spindle and speed as indicated in the Table described in the manual from Brookfield Engineering Laboratories, Inc.

Radiant Panel Flame Spread Test Interim Federal Standard 00136 (COM,NBS) and ASTM E 162-60.

PROPERTIES ON GLASS

Glass, Specular 60° Federal Test Method Standard 141, Method 6101.

Sward Rocker Hardness: "Official Digest" 26, 10301038, November 1954. The values are reported as a percent of glass (glass standard is 100).

Tack Free Dry Time: Federal Test Method Standard 141, Method 4061.

PROPERTIES ON WOOD

Crosscut adhesion test: A series of parallel cuts through the film are made in one direction and a second series at right angles to the first. Eleven cuts 0.79 mm apart are made in each direction forming 100 squares. Adhesive tape is applied over the crosscut area and peeled off to determine coating adhesion. The number of squares remaining intact gives a measure of adhesion.

Impact Test: 0.45 kg. steel ball is dropped from 1.83 meters height. The rating system is 1 to 10 with 10 being the highest resistance (no cracks in coating) and 1 being the lowest resistance (complete coating removal).

Cold Check Resistance Test: Standard Test Method for temperature change resistance of clear nitrocellulose lacquer films applied to wood. ASTM D 1211-60.

PROPERTIES ON METAL

Crosscut adhesion Test: similar to that described above except that the coated surface is metal.

Mandrel Flex: Federal Test Method Standard 141 Method 6221.

Impact Test: Use Parlin-Du Pont Impact Tester described in "Physical and Chemical Examination, Paint, Varnish, Lacquers and Colors" by Gardner and Sward, 12th edition, 1962, Page 146. Values for concave and convex are obtained.

EXAMPLE 1

A one-liter rocker bomb was charged with 200 g. xylene, 126 g. vinyl acetate and 4.5 g. azodiisobutyronitrile. The rocker bomb was cooled to −50°C. and evacuated to a pressure of about 0.3 mm. of mercury. 141 Grams of vinyl chloride were added and the temperature was raised slowly until it reached 29°C. wherein the bomb was pressured to 14.06 kg./sq. cm. with ethylene. At 60°C. the ethylene pressure was raised to 42.18 kg./sq. cm. Over the next four hours the temperature was held at 80°C. with the ethylene pressure at 42.18 kg./sq. cm. The temperature was raised to 90°C. over a period of 25 minutes and held at that temperature for one hour with the pressure at 42.18 kg./sq. cm. The bomb was cooled to room temperature, discharged and rinsed out with 100 g. of xylene. The product solution, including the rinse xylene, weighed 575 g. Its solid content was 42.8 percent. It was concentrated to 84 percent. The ethylene/vinyl chloride/vinyl acetate copolymer, isolated by evaporating a sample of the solution to dryness, had a Shore A Durometer Hardness of 70, a glass transition temperature of −7°C. (by differential scanning calorimetry) and an inherent viscosity of 0.1 dl./g. measured in acetone at 30°C., at a concentration of 0.5 g./100 ml. Its composition determined by analysis for oxygen and chlorine was:

16 percent ethylene
53 percent vinyl chloride
31 percent vinyl acetate

The 84 percent solution of copolymer in xylene was used to prepare a lacquer solution having the following compositions:

| Solids | Parts |
|---|---|
| HB14NC Nitrocellulose (NC) (½ sec. viscosity) | 44.5 |
| E/VCl/VAc copolymer | 35.5 |
| Sucrose Benzoate | 8.9 |
| Di(2-ethylhexyl) phthalate | 11.1 |
| Solvent | Parts |
| Isopropyl Alcohol | 12.1 |
| Methyl Amyl Alcohol | 5.1 |
| Toluene | 24.3 |
| Xylene | 20.1 |
| Methyl m-Butyl Ketone | 30.8 |
| Ethyl Amyl Ketone | 7.6 |

The solids content of the resulting clear lacquer solution was 20 percent. Its Brookfield viscosity was 61.5 cps. suitable for spray application. This compares with a Brookfield viscosity of 62.5 cps. for an 18 percent solids lacquer solution in which the copolymer was replaced by Duraplex ND 77B, a non-oxidizing coconut oil modified alkyd resin sold by Rohm & Haas. This type of resin is a commonly used modifier for nitrocellulose in lacquers.

Coating applied to glass, wood and metal had the following properties:

Properties on Glass

| | |
|---|---|
| Clarity, Visual (Black Glass) | Clear |
| Gloss, Specular 60° | 92.5 |
| Sward Rocker Hardness, Hours after Tack Free Dry | |
| 1 | 10 |
| 4 | 16 |
| 24 | 28 |
| 48 | 32 |
| 1 hr. at 82°C. | 40 |

Properties on Wood

| | |
|---|---|
| Adhesion, Crosscut (% Adhesion) | 100 |
| Impact Test, 0.45 kg. | 9 |
| Cold Check Resistance Test, One cycle = 1 hr. at 49°C. followed by 1 hr. at −21°C. with 30 minute relaxation and rating period (cycles to failure) | Passed 25 cycles |

Properties on Bonderized Steel

| | |
|---|---|
| Adhesion, Crosscut (% Adhesion) | 100 |
| Mandrel Flex | Passed 0.635 cm. |
| Impact Test (kg./m.) | |
| Concave | 0.89 |
| Convex | 0.59 |

EXAMPLE 2

The 84 percent xylene solution of E/VCl/VAc copolymer described in Example 1 was used to make a lacquer solution of the same solids composition as Example 1 except that ¼ sec. viscosity nitrocellulose was used and the solids content was 24 percent. The Brookfield viscosity of the lacquer solution was 78 cps.

In the cold check resistance test on wood a coating of this lacquer passed 22 cycles, while a lacquer in which the copolymer was replaced by Duraplex ND77B, a non-oxidizing coconut oil modified alkyd resin, failed after two cycles.

EXAMPLE 3

The E/VCl/VAc copolymer described in Example 1 was used to make lacquer solutions in which the non-volatile components were proportioned as shown in Table 1. The lacquers were applied to 15.24 cm. × 45.72 cm. × 0.32 cm. maple panels to provide a dry film thickness of 0.05 mm. Following a conditioning period the panels were then subjected to a Radiant Panel Flame Spread Test. Results are shown in Table 1. An uncoated control panel had a flame spread index of 160. It is apparent from the test data that the E/VCl/VAc copolymer contributed significantly to flame spread resistance.

TABLE 1

| | FLAME RETARDANT COATINGS | | | | | |
|---|---|---|---|---|---|---|
| Lacquer Film Composition (Parts) | A | B | C | D | E | F |
| Nitrocellulose | 44.5 | 44.5 | 43.7 | 42.3 | 40.9 | 39.5 |
| Alkyd Resin | 35.5 | — | — | — | — | — |
| E/VCl/VAc Copolymer | — | 35.5 | 34.9 | 33.8 | 32.7 | 31.6 |
| Sucrose Benzoate | 8.9 | 8.9 | 8.9 | 8.9 | 8.9 | 8.9 |

TABLE 1-continued

| Lacquer Film Composition (Parts) | FLAME RETARDANT COATINGS | | | | | |
|---|---|---|---|---|---|---|
| | A | B | C | D | E | F |
| Tris 2,3-dibromopropylphosphate | 11.1 | 11.1 | 12.5 | 15 | 17.5 | 20 |
| Flame Spread Index ($I_s$) | 645 | 357 | 254 | 164 | 144 | 120 |

EXAMPLE 4

An E/VCl/VAc copolymer was prepared as described in Example 1 from 135 g. vinyl acetate, 4.5 g. azobisbutyronitrile and 120 g. vinyl chloride in 200 g. xylene under 49.21 to 56.24 kg./sq. cm. ethylene pressure. The product solution in xylene was 41.4 percent solids and weighed 569 g. It was concentrated to 82 percent solids. A sample of the polymer isolated by evaporation of the xylene had a Shore A Durometer hardness of 0 and a glass transition temperature of −1°C. Its composition was:
  24 percent ethylene
  45 percent vinyl chloride
  31 percent vinyl acetate.

A clear, 20 percent solids lacquer like that described in Example 1 was prepared with this copolymer. Its Brookfield viscosity was 60 cps. Coatings applied to glass, wood, and metal substrates had the following properties:

Properties on Glass

| Clarity, Visual (Black Glass) | Clear |
|---|---|
| Gloss, Specular 60° | 93.5 |
| Sward Rocker Hardness, Hours after Tack Free Dry | |
| 1 | 10 |
| 4 | 14 |
| 24 | 22 |
| 48 | 22 |
| 1 Hr. at 82°C. | 28 |

Properties on Wood

| Adhesion, Crosscut (% Adhesion) | 100 |
|---|---|
| Impact Test | 6 |

Properties on Bonderized Steel

| Adhesion, Crosscut (% Adhesion) | 100 |
|---|---|
| Mandrel Flex | Passed 0.32 cm. |
| Impact Test (kg./m.) | |
| Concave | 0.89 |
| Convex | 0.62 |

EXAMPLE 5

An 18.92-liter stainless steel pressure vessel was fitted with an agitator and an external heat exchanger through which the reaction mixture could be circulated for temperature control. It was charged with the following materials:

373 g. Klearfac AB 270 mono-substituted ortho
           phosphate ester, nonionic surfactant
           (Wyandotte)
     38 g. Ammonium hydroxide (29% NH₃)
    590 g. 3% aqueous solution of Natrosol 300L
           hydroxethylcellulose (Hercules, Inc.)
     71 g. Diammonium phosphate
     44 g. Isopropyl alcohol
   5400 g. Water The vessel was closed, pressured with nitrogen to 7.03 kg./sq. cm., bled down to atmospheric pressure, pressured with ethylene to 7.03 kg./sq. cm., bled down and then pressured again to 7.03 kg./sq. cm. with ethylene and bled down. With the agitator and circulating pump in operation the vessel contents were heated to 82°C. while the vessel was pressured to 84.36 kg./sq. cm. with ethylene. Then 138 g. of a 20 percent solution of ammonium persulfate in water was pumped into the vessel through a feed line. The following materials were added as three separate feed streams at constant rate over a period of 120 minutes.

2120 g. vinyl acetate
    4950 ml. vinyl chloride 720 cc 4.6 percent ammonium persulfate solution During this period the temperature of the reaction mixture was held at 82°C. and the pressure was kept at 84.36 kg./sq. cm. by feeding ethylene as needed. The temperature was raised to 90°C. and was held for 30 minutes. The reaction mixture was discharged into a defoaming vessel from which the ethylene was vented. The product emulsion was cooled to room temperature. It contained 48.8 percent solids. The polymer was isolated by evaporating the emulsion to dryness in a thin film. Its glass transition temperature was 4.5°C. Its composition was as follows:
  15 percent ethylene
  57 percent vinyl chloride
  28 percent vinyl acetate A 17.4 percent solids lacquer solution similar to that of Example 1 was prepared with the above copolymer. Its Brookfield viscosity was 71 cps. Coatings applied to glass, wood and metal substrates had the following properties.

Properties on Glass

| Clarity, Visual (Black Glass) | Clear |
|---|---|
| Gloss, Specular 60° | 93.5 |
| Sward Rocker Hardness, Hrs. after Tack Free Dry | |
| 1 | 14 |
| 4 | 20 |
| 24 | 26 |
| 48 | 26 |
| 1 Hr. at 82°C. | 40 |

Properties on Wood

| Adhesion, Crosscut (% Adhesion) | 100 |
|---|---|
| Impact Test | 9 |
| Cold Check Resistance (Cycles to Failure) one cycle = 1 hr. at 49°C. followed by 1 hr. at −21°C. with 30 min. relaxation period. With HB14 NC (½ second viscosity) | Passed 25 cycles |

Properties on Bonderized Steel

| Adhesion, Crosscut (% Adhesion) | 100 |
|---|---|
| Mandrel Flex | Passed 0.32 cm. |
| Impact Test (kg./m.) | |
| Concave | 0.71 |
| Convex | 0.15 |

EXAMPLE 6

The solvent mixture described in Example 1 and the copolymer described in Example 5 were used to prepare the following lacquer solutions:

| Composition (Parts) | A | B | C | D |
|---|---|---|---|---|
| Nitrocellulose (½ sec. visc.) | 50 | 65 | 50 | 45.5 |
| E/VCl/VAc Copolymer | 50 | 35 | 40 | 45.5 |
| Sucrose Benzoate | — | — | 10 | — |
| Di(2-ethylhexyl) phthalate | — | — | — | 9 |
| Solids (%) | 16 | 16 | 16 | 17.4 |
| Brookfield Viscosity (cps.) | 71 | 152.5 | 71 | 71 |

Coatings applied to glass had the following properties:

| Properties on Glass | Compositions A | B | C | D |
|---|---|---|---|---|
| Clarity, Visual (Black Glass) | Clear | Clear | Clear | Clear |
| Gloss, Specular 60° | 79 | 70 | 84 | 80.5 |
| Sward Hardness, Hrs. After Tack Free Dry | | | | |
| 1 | 18 | 30 | 20 | 14 |
| 4 | 24 | 30 | 22 | 18 |
| 24 | 28 | 30 | 32 | 24 |
| 48 | 28 | 32 | 30 | 26 |
| 1 hr. at 82°C. | 52 | 42 | 40 | 30 |

Formulation D containing plasticizer gave significantly higher solids at spray viscosity than the other three formulations. Formulation D gave a lower hardness value than the other formulations, however. When Formulation D was modified with a hardening resin, e.g., sucrose benzoate, the best combination of end-use properties was obtained.

EXAMPLE 7

The equipment and general procedure described in Example 5 were used to prepare an E/VCl/VAc copolymer emulsion. The charge to the reactor was as follows:

114 g. Ultrawet 35K, sodium dodecylbenzene sulfonate solution
6 g. potassium bicarbonate
4,320 g. Water
334 g. 3% aqueous solution of Natrosol 300L
700 g. Vinyl acetate With the reactor at 36.56 kg./sq. cm. and 80°C., 110 ml. of a 20 percent aqueous solution of sodium persulfate was pumped into the reactor. Then the following materials were added as three separate feed streams at constant rate over a period of about 100 minutes:

| Feed 1: | 3300 g. vinyl acetate |
| Feed 2: | 5200 ml. vinyl chloride |
| Feed 3: | 456 g. Ultrawet 35K |
| | 24 g. potassium bicarbonate |
| | 15 g. sodium persulfate |
| | 1280 g. water |

During this period the temperature of the reaction mixture was held at 80°C. and the pressure was kept at 36.56 kg./sq. cm. by feeding ethylene as needed. Ten minutes after the continuous feeds were in, the temperature was raised to 90°C. over a period of seven minutes. It was held at 90°C. for 10 minutes and then the product was discharged and cooled to room temperature. The product emulsion was 55.1 percent solids. The polymer was isolated by pouring the emulsion onto the rolls of a rubber mill heated to 150°C. and milling until the water evaporated. Its Shore A Durometer Hardness was 99 and the inherent viscosity was 0.45 dl./g. measured in tetrahydrofuran at 30°C. and a concentration of 0.1 g./100 ml. Its glass transition temperature was 26°C. Its composition was as follows:

7 percent ethylene
50 percent vinyl chloride
43 percent vinyl acetate

The following lacquer solutions were prepared with this copolymer as described in Example 6:

| Composition (Parts) | A | B | C | D |
|---|---|---|---|---|
| Nitrocellulose (½ sec. visc.) | 50 | 65 | 50 | 50 |
| E/VCl/VAc Copolymer | 50 | 35 | 40 | 40 |
| Sucrose Benzoate | — | — | 10 | — |
| Di(2-ethylhexyl) phthalate | — | — | — | 10 |
| Solids (%) | 14 | 12.8 | 14 | 14 |
| Brookfield viscosity (cps.) | 78 | 78 | 72.5 | 64 |

Coatings applied to glass, wood and metal had the following properties:

| Properties on Glass | Composition A | B | C | D |
|---|---|---|---|---|
| Clarity, Visual (Black Glass) | Clear | Clear | Clear | Clear |
| Gloss, Specular 60° | 84.5 | 89.5 | 90 | 92 |
| Sward Rocker Hardness, Hrs. after Tack Free Dry | | | | |
| 1 | 18 | 28 | 18 | 14 |
| 4 | 24 | 36 | 28 | 20 |
| 24 | 36 | 38 | 40 | 26 |
| 48 | 38 | 38 | 40 | 28 |
| Properties on Wood | | | | |
| Adhesion, Crosscut (% Adhesion) | 100 | 100 | — | — |
| Impact Test | 9 | 6 | — | — |
| Properties on Bonderized Steel | | | | |
| Adhesion, Crosscut (% Adhesion) | 0 | 80 | | |
| Mandrel Flex | Passed 0.635 cm. | Failed 1.27 cm. | | |

Copolymers containing ethylene in amounts less than 6 percent by weight did not give the desired combination of hardness and flexibility properties.

EXAMPLE 8

The equipment and general procedure described in Example 5 were used to prepare an E/VCl/VAc copolymer emulsion. After isolating the copolymer the following results were obtained relating to the copolymer.

| | |
|---|---|
| Glass transition temperature (°C.) | +29 |
| Brookfield viscosity, 20% solids (cps.) | 25 |
| Solution clarity | clear |

The composition of the copolymer was as follows:
10.5 percent ethylene
54.5 percent vinyl chloride
35.0 percent vinyl acetate The following lacquer solutions were prepared using the above-identified copolymer and compared with an alkyd control which contained no copolymer. The glass transition temperature of the alkyd control was +1 and the Brookfield viscosity, 20 percent solids, was 7.

| Composition (Parts) | A | Alkyd Control | B | Alkyd Control |
|---|---|---|---|---|
| Nitrocellulose (½ sec. visc.) | 50 | 50 | 65 | 65 |
| E/VCl/VAc copolymer | 50 | — | 35 | — |
| Solids (%) | 16 | 16 | 14.3 | 13.3 |
| Brookfield viscosity (cps.) | 49 | 70 | 70 | 62.5 |
| Properties on Glass: | | | | |
| Clarity, Visual (Black Glass) | Clear | Clear | Clear | Clear |
| Gloss, Specular 60° | 87 | 94.5 | 88.5 | 94 |
| Sward Rocker Hardness, Hrs. after Tack Free Dry | | | | |
| 1 | 16 | 34 | 34 | 28 |
| 2 | 18 | 34 | 36 | 40 |
| 4* | 18 | 46 | 34 | 46 |
| 24* | 36 | 54 | 38 | 50 |
| 48* | 36 | 50 | 36 | 58 |

*Determined in the constant temperature room at 22 ± 1.1°C. and 50% ± 5% R.H.

1. A coating comprising a blend of nitrocellulose and a copolymer having an inherent viscosity below 0.4 dl./g. in acetone at 30°C. at a concentration of 0.5 g./100 ml. consisting essentially of 6 to 32 percent by weight ethylene, 36 to 65 percent by weight vinyl chloride and 23 to 50 percent by weight vinyl acetate in an organic solvent system, the ratio of nitrocellulose to copolymer being 80:20 to 20:80.

2. A coating composition according to claim 1 wherein the ratio of nitrocellulose to copolymer is 60:40 to 40:60.

3. A coating composition according to claim 1 wherein there is present up to 12 percent by weight, based on the weight of nitrocellulose and copolymer, of at least one modifying resin.

4. A coating composition according to claim 3 wherein the modifying resin is sucrose benzoate.

5. A coating composition according to claim 3 wherein the modifying resin is a maleic acid resin.

6. A coating composition according to claim 1 wherein there is present up to 15 percent by weight, based on the weight of nitrocellulose and copolymer, of a plasticizer.

7. A coating composition according to claim 6 wherein the plasticizer is tris 2,3-dibromopropyl phosphate.

8. A coating composition according to claim 1 wherein the organic solvent system is a mixture of at least two organic compounds.

9. A coating composition according to claim 1 wherein the organic solvent system contains xylene.

10. A coating composition according to claim 1 wherein the copolymer consists essentially of 10 to 16 percent by weight ethylene, 50 to 60 percent by weight vinyl chloride, and 23 to 35 percent by weight vinyl acetate.

11. A coating composition according to claim 1 wherein the inherent viscosity of the copolymer is below 0.2 dl./g. in acetone at 30°C. at a concentration of 0.5 g./100 ml.

* * * * *